(12) United States Patent
Pishdadian et al.

(10) Patent No.: US 7,706,028 B2
(45) Date of Patent: Apr. 27, 2010

(54) APPARATUS AND METHOD FOR SCANNING AN OBJECT

(75) Inventors: Hamid Pishdadian, Warwick, RI (US); Richard A. Genga, Jr., East Greenwich, RI (US); Alan Schinazi, Providence, RI (US); Justin W. Sirotin, Providence, RI (US); Carl B. Dumas, Tiverton, RI (US)

(73) Assignee: Acushnet Company, Fairhaven, MA (US)

( * ) Notice: Subject to any disclaimer, the term of this patent is extended or adjusted under 35 U.S.C. 154(b) by 1172 days.

(21) Appl. No.: 11/298,171

(22) Filed: Dec. 10, 2005

(65) Prior Publication Data

US 2006/0098896 A1 May 11, 2006

Related U.S. Application Data

(63) Continuation-in-part of application No. 10/915,900, filed on Aug. 11, 2004, now Pat. No. 7,557,966.

(51) Int. Cl.
*H04N 1/04* (2006.01)
*H04N 1/46* (2006.01)

(52) U.S. Cl. .................. 358/474; 358/475; 358/505

(58) Field of Classification Search ........... 358/474, 358/505, 475; 382/154; 702/153
See application file for complete search history.

(56) References Cited

U.S. PATENT DOCUMENTS

| | | | | |
|---|---|---|---|---|
| 4,634,279 A | 1/1987 | Ross et al. | ............. | 356/376 |
| 4,654,872 A | 3/1987 | Hisano et al. | ............. | 382/1 |
| 4,745,290 A | 5/1988 | Frankel et al. | ............. | 250/560 |
| 4,982,438 A | 1/1991 | Usami et al. | ............. | 382/25 |
| 5,094,538 A | 3/1992 | Reedman et al. | ........ | 356/376 |
| 5,164,793 A | 11/1992 | Wolfersberger et al. | .... | 356/376 |
| 5,237,520 A | 8/1993 | White | ............. | 364/560 |
| 5,285,397 A | 2/1994 | Heier et al. | ............. | 364/559 |
| 5,911,126 A * | 6/1999 | Massen | ............. | 702/153 |
| 6,028,672 A | 2/2000 | Geng | ............. | 356/376 |
| 6,137,902 A | 10/2000 | Kinoshita et al. | ............. | 382/154 |

(Continued)

FOREIGN PATENT DOCUMENTS

DE 198 00 086.3 7/1999

(Continued)

OTHER PUBLICATIONS

FotoScan News.

*Primary Examiner*—Houshang Safaipour
(74) *Attorney, Agent, or Firm*—Troy R. Lester

(57) ABSTRACT

A scanner has a plurality of cameras positioned around an object to be scanned. The object is illuminated by unstructured light and the object is covered by a textured surface. The cameras can be arranged as pairs and each camera pair is supported on a single support. The scanned object can be a foot, among other things, and the scanner is positioned at a predetermined incline so that the foot is evenly supported. A positioning system, either visual or automatic, is included on the scanner platform. If automatic, a sensor array is affixed to the platform such that a scan will only initiate when certain sensors or combinations of sensors are ON. Method for attaching the camera pairs on the support, method for calibrating the camera pairs and method of scanning the foot to provide shoe sizes and shoe lasts are also disclosed.

10 Claims, 12 Drawing Sheets

U.S. PATENT DOCUMENTS

| | | | |
|---|---|---|---|
| 6,205,243 B1 | 3/2001 | Migdal et al. | 382/154 |
| 6,377,700 B1 | 4/2002 | Mack et al. | 382/154 |
| 6,396,946 B1 | 5/2002 | Sogawa | 382/154 |
| 6,549,639 B1 | 4/2003 | Genest | 382/100 |
| 6,549,650 B1 | 4/2003 | Ishikawa et al. | 382/154 |
| 6,611,617 B1 | 8/2003 | Crampton | 382/154 |
| 6,633,326 B2 | 10/2003 | Fukumoto et al. | 348/42 |
| 2001/0020222 A1 | 9/2001 | Lee et al. | 702/155 |
| 2002/0039134 A1 | 4/2002 | Fukumoto et al. | 348/77 |
| 2003/0142862 A1 | 7/2003 | Snow et al. | 382/154 |
| 2003/0142863 A1 | 7/2003 | Massen | 382/154 |
| 2003/0174880 A1 | 9/2003 | Sakamoto et al. | 382/154 |

FOREIGN PATENT DOCUMENTS

| | | |
|---|---|---|
| WO | WO 94/20020 | 9/1994 |
| WO | WO 98/18386 | 5/1998 |

\* cited by examiner

APPARATUS AND METHOD FOR SCANNING AN OBJECT

CROSS-REFERENCE TO RELATED APPLICATION

The present application is a continuation-in-part of U.S. patent application Ser. No. 10/915,900 filed on Aug. 11, 2004 now U.S. Pat. No. 7,557,966, the disclosure of which is incorporated herein by reference in its entirety.

FIELD OF THE INVENTION

This invention relates generally to an apparatus and method for scanning an object. More particularly, this invention relates to an apparatus and method for scanning the three-dimensional shape of a foot.

BACKGROUND OF THE INVENTION

The footwear industry has become a large, specialized, and competitive environment. The industry has long-established methods of operation, one of which is to determine shoe size based upon the length and width of the foot. Shoe lasts, which are solid forms upon which shoes are constructed, for each shoe size are used in the manufacture of shoes. Therefore, properly sized lasts are essential for a successful shoe line. Properly fitting shoes are always important to consumers, but fit can be particularly important for golfers, who wear relatively stiff golf shoes over varied terrain, for relatively long periods of time, and in varied weather conditions. Golfers often experience blisters caused by poorly fitting golf shoes. Poorly fitting shoes can also affect the golfers' hitting performance by not providing a stable base for their feet during golf swings. Thus, it is important to obtain the best fitting shoes to minimize such problems.

Various mechanical techniques have been proposed in the past for obtaining foot measurements. For example, most shoe stores commonly use a foot measuring scale known as the Brannock device, produced by the Brannock Device Company of Syracuse, N.Y. This device consists of a metal base plate with several sliding scales. It measures the length and width of the foot to determine an appropriate shoe size. One problem associated with the Brannock device is that its foot measurements are only two dimensional in nature, measuring an absolute length from heel to toe and the width. This method fails to take into consideration factors such as type of heel, e.g., bony versus padded; shape of the toes, e.g., square versus tapered; insole arch; and other characteristics. This device also fails to measure characteristics associated with medical problems such as bunions, which require larger shoe sizes to accommodate abnormalities of the foot.

Some systems use cameras to determine the characteristics of the foot. U.S. Pat. No. 5,911,126 to Massen discloses a method and arrangement for digitizing three-dimensional sensing of the shape of bodies or body parts. The data can be used for automated fabrication of a shoe last, bedding or foot molding, for example. This system uses an elastic envelope worn over the foot/body part during imaging by several cameras surrounding the foot/body part. The envelope carries a high-contrast pattern that allows for digitizing of the image. This method requires that a high contrast pattern is applied on to the bodies or body parts to provide the contrast for digital manipulation.

Other systems have proposed the use of laser beam measurement to determine the characteristics of the foot, as disclosed in U.S. Pat. No. 4,745,290 to Frankel et al, Pat. No. 5,164,793 to Wolfersberger et al and Pat. No. 5,237,520 to White. In the Frankel and Wolfersberger references, the heel area is not measured. In the White patent, the dimensions of the upper foot are not obtained. Since all areas of the foot are important for a proper fit, omitting these areas is undesirable. Additionally lasers, which are structured light sources, do not illuminate the entire foot at once. The foot is typically painted line-by-line, sequentially until the entire foot is painted. This method of illumination takes time and requires a control mechanism for the laser. The foot must also remain stationary during this time period. Furthermore, laser systems are expensive.

U.S. Pat. No. 6,633,326 to Fukumoto describes an image system, whereby an image pickup head having a CCD camera mounted thereon captures image(s) of a foot. The image pickup head is mounted on an elliptical rail surrounding the foot. The reference also discloses a particular arrangement of signal cable and auxiliary cable to prevent entanglement. The foot needs to remain stationary for a relatively long time for the camera to image all sides of the foot. This reference does not disclose how the image(s) can be processed to create a three-dimensional model of the foot.

Hence, there remains a need in the art for an apparatus and method for accurately measuring feet for production of lasts and selection of proper fitting shoes, among other uses.

Further, in obtaining an image from a scanning system, it is often desirable to position the object within a very specific field of view for optimal image capture. Hence, there remains a need in the art for an automatic object placement verification system for use with an apparatus and method for accurately measuring feet for production of lasts and selection of proper fitting shoes, among other uses.

SUMMARY OF THE INVENTION

The present invention is directed to a method for establishing a position of an object to be scanned comprising the steps of:
(i) placing the object on a scanning platform, wherein the scanning platform includes a predetermined scanning area having at least one sensor;
(ii) obtaining a signal from the sensor; and
(iii) analyzing the signal to determine if the object is within the predetermined scanning area.

The present invention is also directed to a placement system for a scanner including a scanning platform having a predetermined scanning area, at least one sensor on the scanning platform to confirm placement of an object within the predetermined scanning area, a querying computer for querying the sensor, and an interface computer for interacting with the user of the scanner.

The present invention is also directed to a scanner having a plurality of camera clusters positioned around an object to be scanned. The object is illuminated by unstructured light and covered by a textured surface. The cameras of the camera clusters are positioned offset to each other in at least one direction.

BRIEF DESCRIPTION OF THE DRAWINGS

In the accompanying drawings, which form a part of the specification and are to be read in conjunction therewith, like reference numerals are used to indicate like parts in the various views.

DETAILED DESCRIPTION OF THE INVENTION

Figure 1:
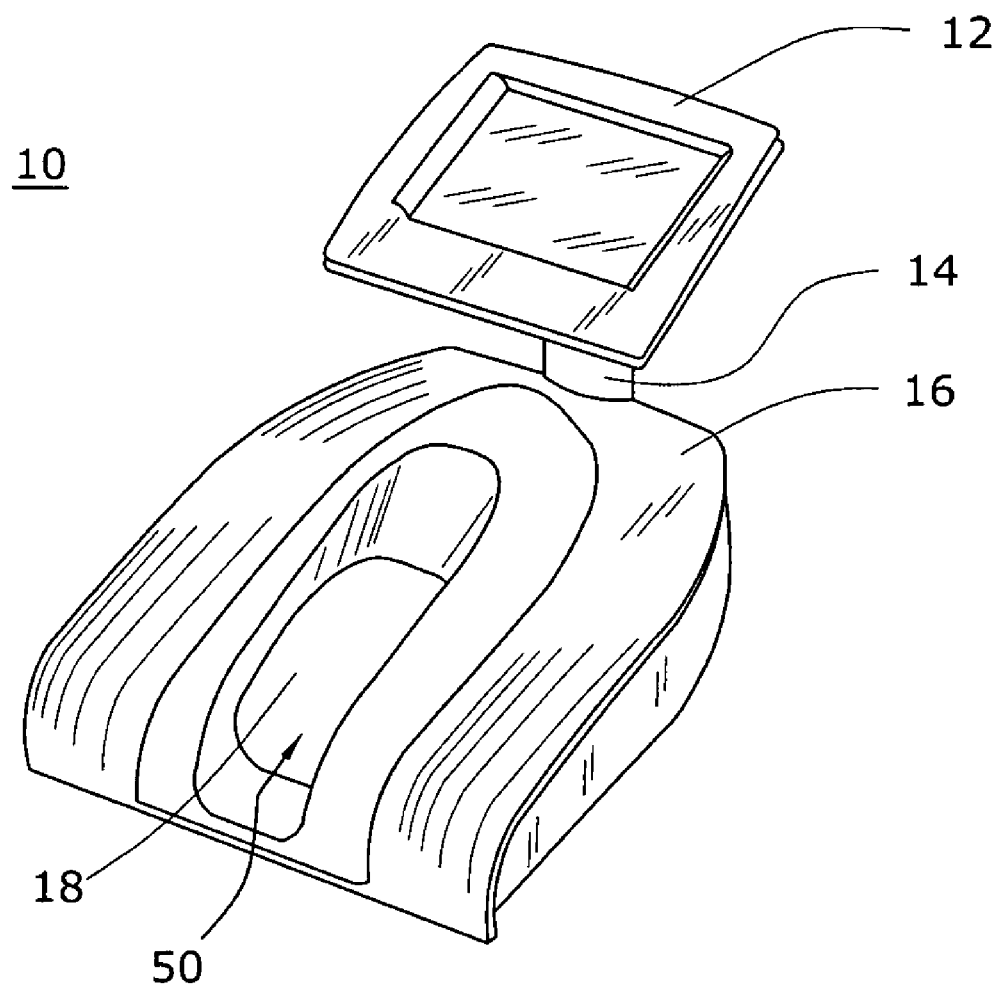
FIG. 1 is a perspective view of a scanner in accordance with the present invention.

Referring to FIG. 1, scanner 10 comprises a display or monitor 12 supported by neck 14 on housing 16. Display 12 preferably has touch screen capability to interact with users. Neck 14 can be telescopic so that monitor 12 can be raised or lowered. Housing 16 defines cavity 18, which is sized and configured to receive an object to be scanned. Any three-dimensional object can be scanned, and cavity 18 can be enlarged to accommodate objects of any size. The present invention is described below using a foot; however, the present invention is not limited to any particular scanned object.

Figure 2:
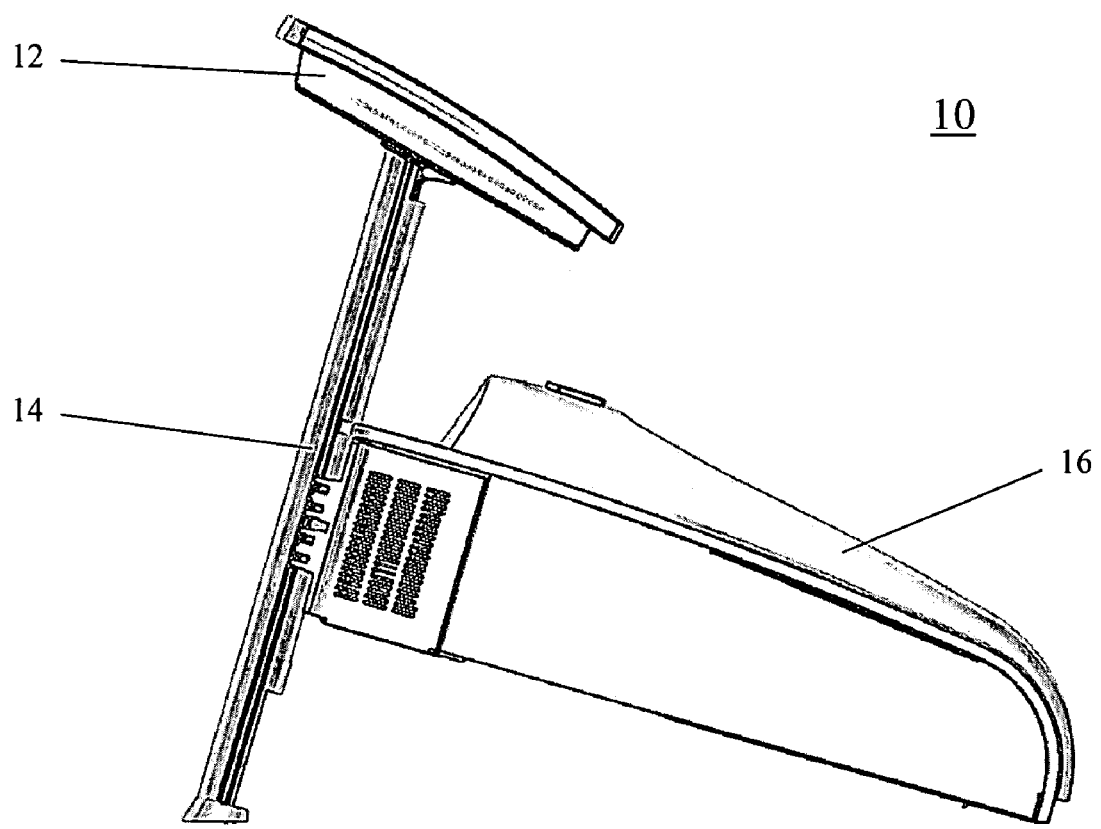
FIG. 2 is a side view of the scanner is FIG. 1.

As shown in FIG. 2, housing 16 is preferably orientated at an incline relative to a surface supporting the scanner. The inventors of the present invention have determined that a foot inclined at a predetermined range of inclination angles exerts even pressure on the foot. In other words, at the preferred inclination the foot exerts even pressure on the heel and the balls. Advantageously, no part of the foot is unevenly deformed or squashed so as not to cause improper foot measurements. For persons weighing between 100 lbs and 250 lbs, the preferred inclination angle ranges from about 12° to about 20°, more preferably about 14° to about 18° and most preferably about 16°.

Referring to FIGS. 3-6, inside housing 16 and supported on platform 20 are camera pairs 22 comprising cameras 24, 26, and central processing unit or equipment (CPU) 28. Platform 20 may also support a hard drive, input/output (I/O) boards, USB boards, telephone modem, wireless communication devices, display units, etc. Camera pairs are preferred, because the pairs provide depth perception to the image, similar to binoculars and human/animal eyes. The processes for manipulating the data from the images taken from the camera pairs are discussed below. Although the present invention is described herein with cameras 22 arranged in pairs, single cameras can also be used, instead of pairs with the present invention. For single cameras, depth perception can be obtained by using adjacent cameras as pairs. A single camera can be a part of two pairs with its two adjacent cameras. A single camera can also form a pair with a non-adjacent camera. Alternatively, a single camera may be rotatably mounted on a support such that the camera may be toggled between two positions so as to simulate having a pair of cameras. For example, a camera mount may be electronically controlled to take a picture in a first orientation, move the camera a specified distance, such as through a predetermined angle in any direction, to a second orientation, then take a second picture in the second orientation. Preferably, the specified distance is small, such as less than about 5 degrees.

Unique to the present invention, unstructured light is used to illuminate the scanned object covered by a textured surface. Unstructured light includes, but is not limited to, sunlight, diodes, fluorescent light, and incandescent light, among others. Unstructured light broadly includes any light sources that don't have controlled frequencies. The entire scanned object can be illuminated at once, thereby eliminating the time consuming step of sequentially painting an object line-by-line with a structured laser beam. The optical pattern necessary for analyzing the scanned object is provided by a textured surface covering the scanned object. In accordance with one aspect of the present invention, the textured surface can be a textile sock covering a foot. Preferably, the sock fits snugly over the foot and without the sag rings around the ankles, so that a proper foot measurement can be achieved. Suitable socks can have any color or pattern and preferably have one color. If the socks have multiple colors, preferably the colors do not substantially contrast each other. The socks can be athletic socks or dress socks, and can be made from woven, non-woven, stitch-bonded non-woven or knit textiles.

At least three camera pairs can be deployed to image the foot, including toe camera pair 32 and two side camera pairs 34. These three camera pairs can image the top and sides of the foot. Alternatively, the two side camera pairs 34 can be used along with a positioning device, such as a heel stop or toe stop (not shown). Any number of cameras can be deployed, and preferably seven camera pairs are used, as shown in FIGS. 3-6.

Figure 4:
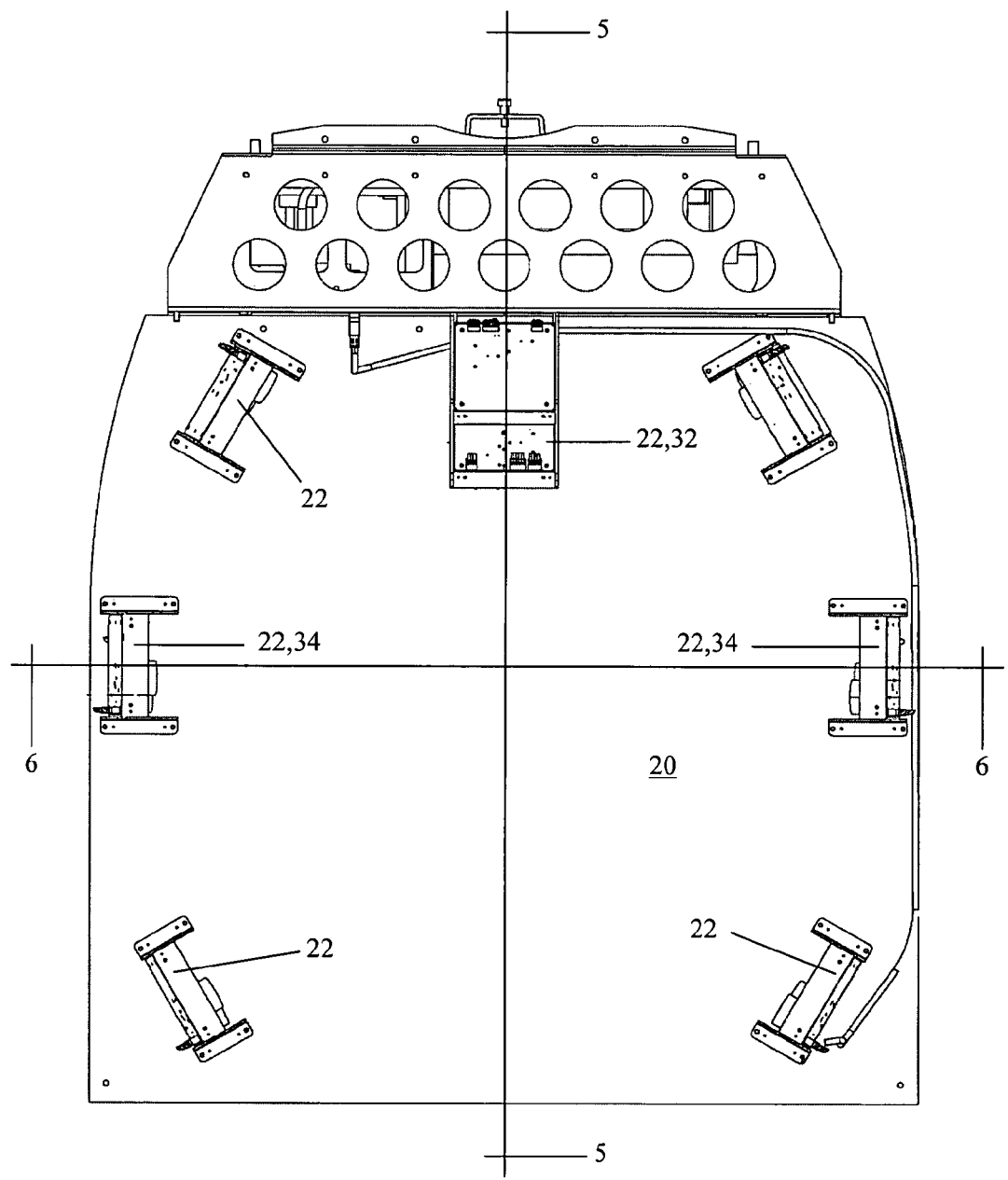
FIG. 4 is a top view of the cameras and processing equipment of FIG. 3.

As best shown in FIG. 4, one of the camera pairs is preferably toe camera pairs 32, and the remaining camera pairs are preferably evenly distributed as shown to capture all surface areas of the foot. Two of the remaining camera pairs are preferably side cameras 34. Alternatively, camera pairs 22 are not evenly spaced apart, so long as their fields of vision (FOVs) overlap each other so that all surface areas of the foot are imaged. Camera pairs 22 can be evenly, angularly spaced apart, while the distances to the scanned object are uneven, or vice versa. In accordance to another aspect of the present invention, the FOVs do not necessarily overlap each other, but each FOV images a distinct part of the foot to measure the size of the foot and/or to form a last representative of the foot. In the art of shoemaking, twelve separate measurements of the foot are necessary to construct a last. Hence, each camera or camera pair can measure one or more measurements to make a last.

To obviate the need to focus the cameras prior to imaging, the cameras preferably have relatively small aperture. The aperture can be as small as F-22. Smaller aperture provides a relatively long distance within which no focusing is necessary. In one embodiment, an F-8 aperture is selected for the cameras. This aperture provides a fixed focus from about 6 inches to 14 inches away from the lenses. Preferably, the scanned object is positioned within this fixed focus distance. Camera pairs 22 may have different aperture sizes.

Suitable cameras include, but are not limited to, CMOS (complimentary metal-oxide sensor) digital or electro-optical cameras. Suitable CMOS cameras are commercially available from OmniVision Technologies, Inc. of Sunnyvale, Calif., Micron Technology, Inc., of Boise, Id. and, Veo, Inc. of San Jose, Calif., among other. Each of the cameras has a lens that direct light to strike an array or panel of image sensor photo-sensitive cells or pixels. Each photo-sensitive cell or pixel is a photo-transistor which converts light into a voltage signal representing the light level. The voltage signal is stored as analog information and then digitized by an analog-digital-converter. Alternatively, CCD (charge coupled device) cameras can be used. CMOS and CCD cameras are widely available as consumer digital cameras. Analog cameras can also be used, so long as the image can be digitized thereafter, e.g., by digital scanning.

Figure 5:
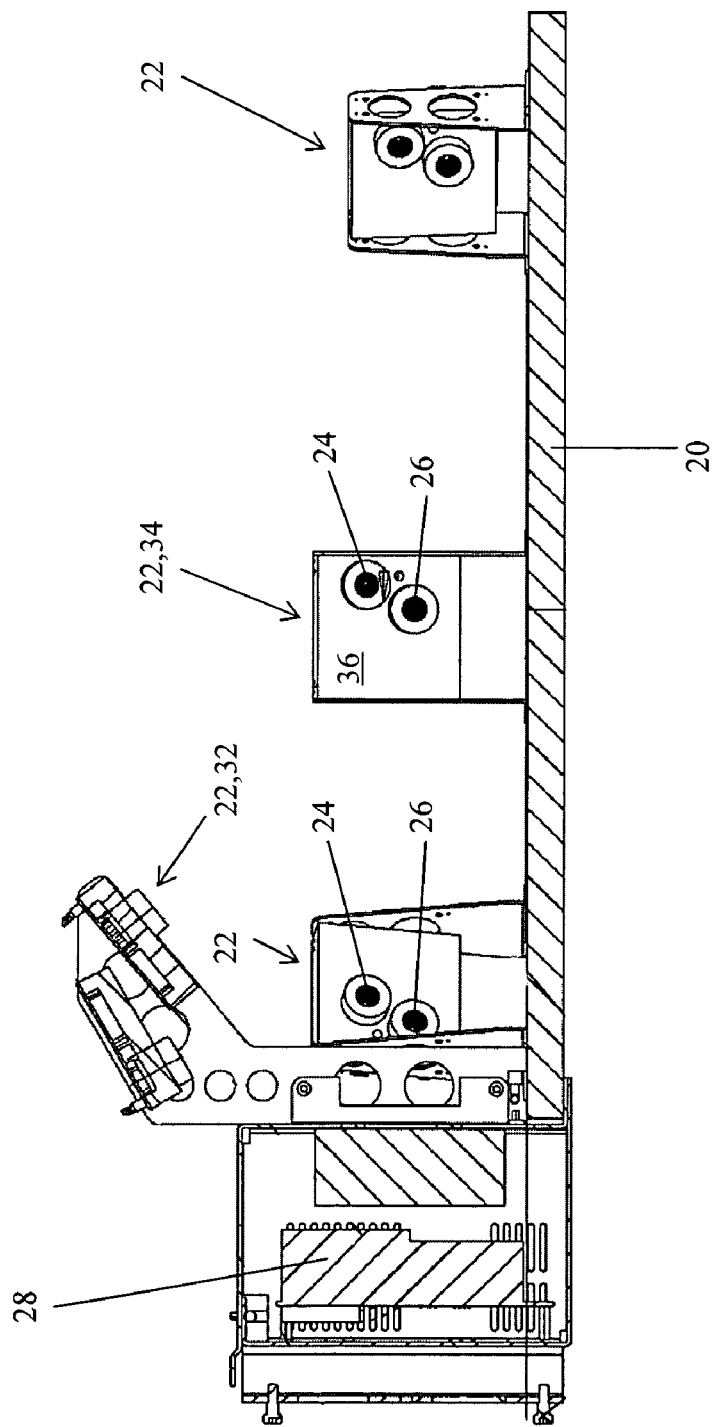
FIG. 5 is a cross-sectional view along line 5-5 in FIG. 4.
Figure 6:
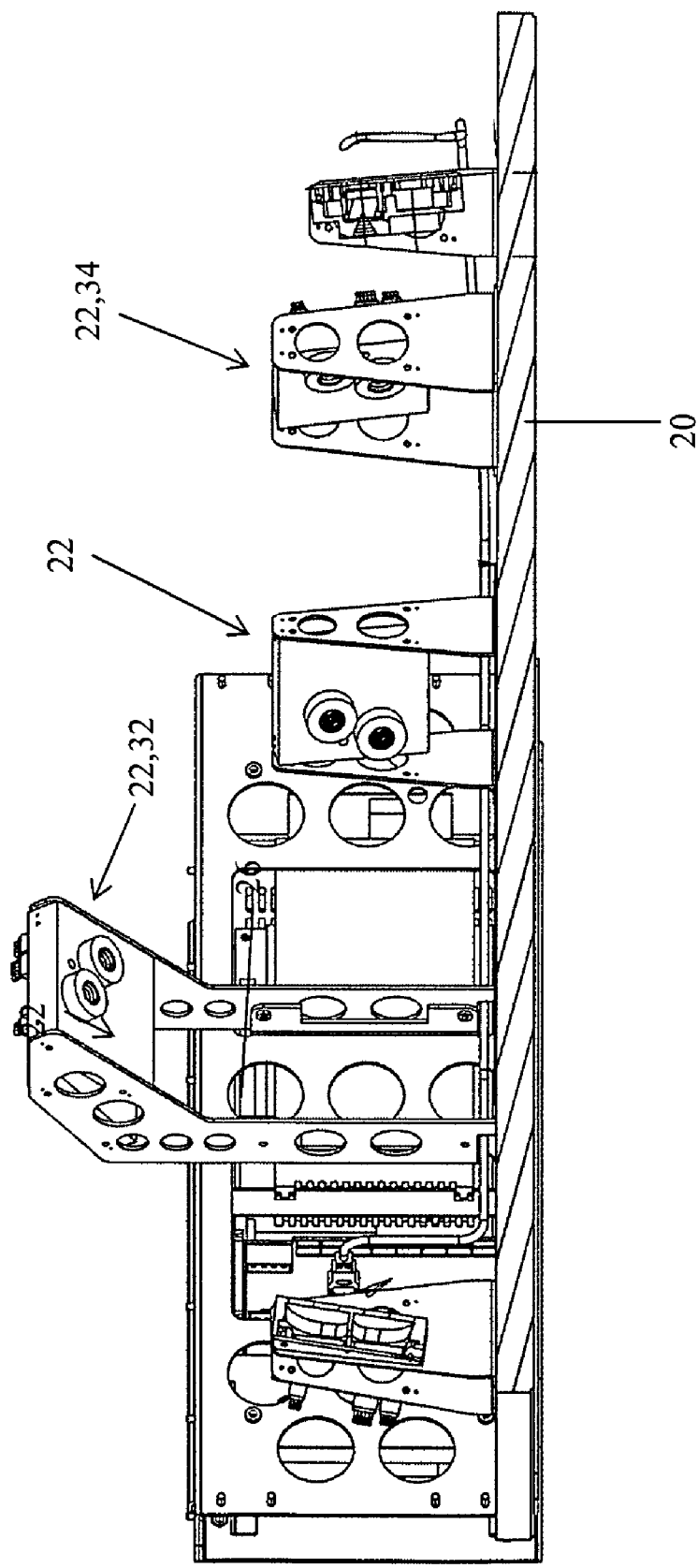
FIG. 6 is a cross-sectional view along line 6-6 in FIG. 4.
Figure 7:
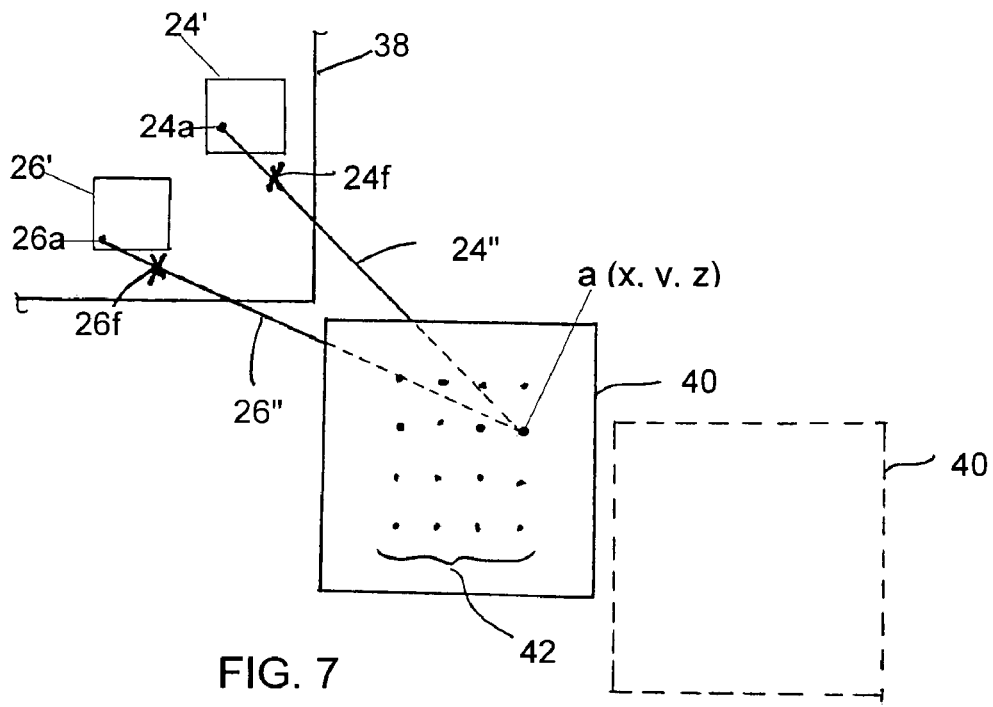
FIG. 7 is a front view of the printed circuit board (with certain details omitted for clarity) located behind one of the camera pairs illustrating the triangulation technique and calibration technique.

Referring to FIG. 5, where a front view of camera pairs 22 is shown, cameras 24 and 26 of camera pairs 22 are supported on front face 36. Front face 36 also protects the electronics on the printed circuit board (PC) 38. As shown in FIG. 7 with other details omitted for clarity, directly behind each camera 24, 26 is the photo-sensitive panel 24', 26', respectively. Preferably, photo-sensitive panels 24', 26' are positioned parallel or co-planar to each other. According to one aspect of the invention, each photo-sensitive panel comprises a two-dimensional array of 1280 pixels by 1084 pixels to give each panel about 1.38 megapixels. In one embodiment, the cameras are black and white cameras, and each pixel when exposed records a gray value having a numerical representation of 0-255 on the gray scale. Alternatively, color cameras can be used. During manufacturing, each panel 24', 26' is fixedly attached to PC 38 by molten solder. Due to its relatively high viscosity, the surface tension of the molten solder keeps the panels oriented substantially parallel to PC 38. As the solder hardens, photo-sensitive panels 24', 26' are fixed to PC 38.

To compensate for any misalignment from this parallel arrangement, each PC 38 is calibrated. Referring again to FIG. 7, cameras 24, 26 (not shown) are mounted on top of photo-sensitive panel 24', 26' in front of calibration board 40. Calibration board 40 comprises a plurality of markings 42. Each marking 42 is preferably unique from each other and the locations of markings 42 on calibration board 40 are known. Calibration board 40 is located parallel to PC 38 at known distances, so that the location of each marking 42 in three-dimensional space relative to cameras 24, 26 is known. Each marking 42 is imaged by cameras 24, 26 via focal points 24$f$, 26$f$, respectively. Each marking is exposed at different locations on photo-sensitive panels 24', 26'. By comparing the locations of each marking on photo-sensitive panels 24', 26' to each other and to the known location of corresponding marking 42 on calibration board 40 using the triangulation technique discussed below, any misalignment from the parallel orientation can be detected. Calibration board 40 is preferably positioned at three different locations from PC 38, e.g., 6 inches, 11 inches and 14 inches away from PC 38, during calibration. Corrections to restore the parallel arrangement can be calculated and stored on a memory on each PC 38.

One readily apparent advantage of the present invention is that by placing both photo-sensitive panels and both cameras on a single PC board it is easier to arrange the photo-sensitive panels to be parallel or co-planar to each other. As used herein, the term parallel includes both parallel and co-planar.

As best shown in FIG. 5, the cameras in pairs 22 are offset with respect to each other, i.e., they do not align vertically or horizontally with each other. In one aspect of the invention, cameras 24 and 26 are offset about 0.5 inch in the vertical direction and about 1.0 inch in the horizontal direction relative to platform 20. Any offsetting geometry can be utilized, although the offset is preferably between about 0.5 inches and 1.0 inch in any direction. The offsetting location enhances the depth perception of the camera pairs.

The method of locating a single point or pixel in three-dimensional space by both cameras is based on binocular triangulation methodology. Referring again to FIG. 7, an arbitrary point "a" in three dimensional space (x, y, z) or (R, Ø, Θ) creates image point 24a on panel 24' and image point 26a on panel 26'. In one example, point "a" can be any point on the textured surface of the sock covered foot. The relative locations of these image points are different on the photo-sensitive panels. In other words, image points 24a and 26a are located at different relative positions on photo-sensitive panels 24' and 26'. To match image points 24a to image point 26a to represent point "a" in three-dimensional space, in one embodiment a PC processor, which is preferably located on PC 38, searches and matches neighboring points or pixels in the vertical and horizontal directions. When the neighboring horizontal and vertical pixels match to each other, then a match is found for image point 24a and image point 26a. When the contour of the foot or the scanned foot is sharp, e.g., around the ankle or greater than 45°, or when point "a" is located near the edge of the camera lens, image points 24a, 26a may not match each other. Unmatched points in the images are relatively few in numbers, and some images do not have unmatched points.

Binocular triangulation also provides depth perception, because an object is viewed by two lenses (or eyes) and the two images are joined to create a single image. The depth or distance between the scanned object (e.g., the scanned foot or calibration board 40) and cameras 24, 26 can be determined from the distance between matched points 24a and 26a, as measured on the PC board and the angle between line 24" connecting point 24a to point "a" and line 26" connecting point 26a to point "a." Hence, by employing camera pairs the location of any pixel representing a point on the scanned foot in three-dimensional space relative to the camera pairs is known. Also, as discussed above binocular triangulation can be used with single cameras instead of camera pairs, when adjacent (or non-adjacent) single cameras are paired up for triangulation.

Figure 7B:
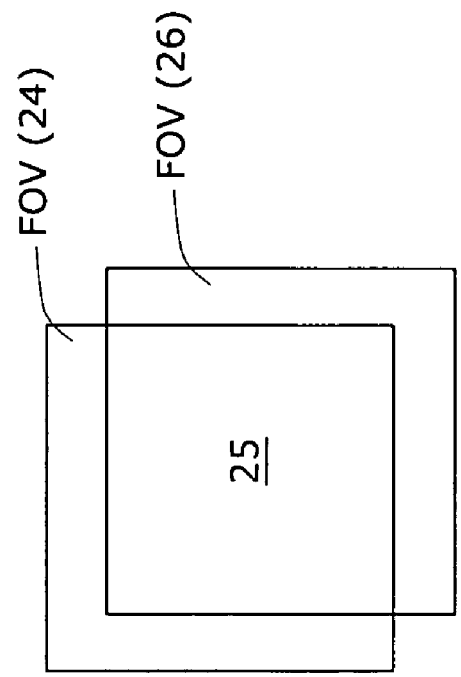
FIG. 7B is a schematic view of overlapping FOV between the camera pairs.
Figure 7A:
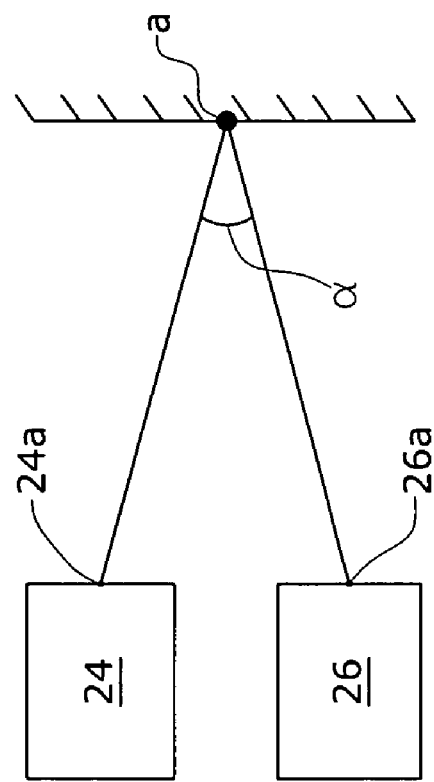
FIG. 7A is a schematic view of showing an angle defined by the camera pairs and the object to be scanned.

As shown in FIG. 7A, cameras 24 and 26 are positioned relative to each other such an incident angle, $\alpha$, is defined between image point 24a and image point 26a and point a on the object to be scanned. Preferably, incident angle $\alpha$ is less than about 90 degrees and preferably less than about 45 degrees so that the overlap 25, shown in FIG. 7B of the FOV of camera 24 and the FOV of camera 26 is maximized. The overlap of these fields of view is preferably greater than about 60%, and, more preferably, at least about 80%, although any amount of overlap may be used in the present invention. Overlapping FOVs and incident angle $\alpha$ are exemplary factors that can be utilized to control the offset or positions of camera pairs.

To minimize calculation errors, after image point 24a is matched to image point 26a, the distance between point "a" in three-dimensional space as seen by camera 24 and the same point "a" as seen by camera 26 is calculated. Optimally, this distance should be as small as possible, and preferably it should approach zero. If this distance is greater than a predetermined threshold, then the PC processor or CPU 28 should return an error signal. Alternatively, a mid-point is chosen based on this distance and point "a" is set or reset to the mid-point. For the purposes of this application, "mid-point" is considered to be the shortest distance, or the common point, for a camera pair 22. Any arbitrary point within this distance can be used, e.g., one-third, one-fourth, one-fifth or any fraction of this distance, can be used.

As stated above, each PC 38 preferably has its own processor or controller to process the data generated by the cameras and a memory storage device (such as flash memory, EEPROM, EPROM, RAM, etc.) to store the raw data as well as the triangulated data of matched points and unmatched points, to store the calibration routine, and to transfer the triangulated data to CPU 28 for further analysis. PC 38 can communicate with CPU 28 by radio frequency, serial or parallel port connections, optical fibers, USB, USB-2, among others. USB and USB-2 are the preferred connection modes due to their high transmission speeds and low costs.

After calibration, each PC and camera pair are fixedly attached to platform 20, such that the positions of the camera pairs are known and should not change significantly. Each camera pair can image other camera pairs in its FOV to calibrate and measure the relative distance between the cameras. For example, referring to FIG. 4, left side camera pair 34 can image right side camera pair 34 and lower right hand camera pair 22 can image upper left hand camera pair 22 and toe camera pair 32 to fix their positions. The relative positions of the camera pairs to each other and on platform 20 can be stored in CPU 28.

Since each camera pair 22 has been calibrated so that the positions in three-dimensional space of the scanned image in its FOV relative to the camera pair are known and since the locations of each camera pair relative to each other on platform 20 in scanner 10 are also known, the locations of each pixel in three dimensional space representing the scanned foot after the images from each camera pair have been stitched together are also known.

Figure 8A:
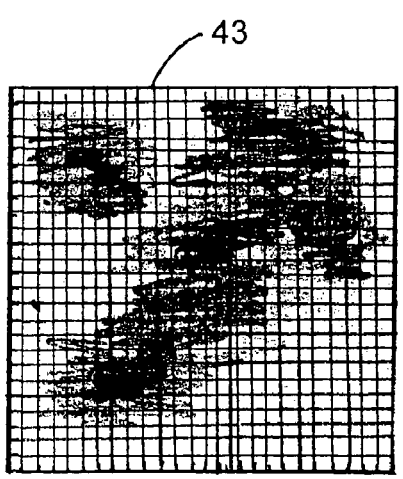
FIG. 8(*a*) is an exemplary portion of a triangulated image in gray scale and FIG. 8(*b*) is an exemplary portion of FIG. 8(*a*) in binary black/white scale.
Figure 8B:
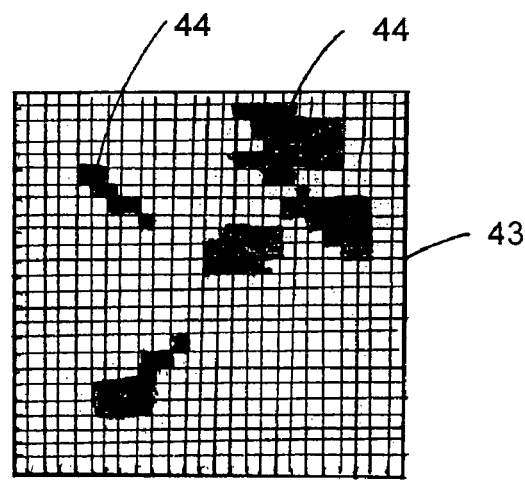

After CPU 28 receives all of the triangulated images captured by the camera pairs, CPU 28 stitches or otherwise combines these images to create a three-dimensional image of the sock-covered foot, e.g., point cloud. An exemplary image received by CPU 28 is shown in FIG. 8(*a*). In one preferred embodiment, an area 43 equivalent to 32 pixels by 32 pixels is selected for matching an image to adjacent images. Selected area 43 represents a portion of the textured sock imaged by a camera pair. Selected areas 43 are located in the areas where the FOVs of adjacent camera pairs are overlapping each other. In any selected area 43, each pixel has a gray scale value from 0 to 255 produced by the black and white digital cameras. Zero value can designate white and a 255 value can designate black and everything in between represents a different shade of gray. Hence, a selected area 43 in gray scale in one image can be searched and matched to a corresponding selected area 43 on an adjacent image. Once a match is made, two adjacent triangulated images can be stitched together with the matched selected areas 43 superimposing each other.

Since selected area 43 in gray scale requires a significant amount of memory storage and processing speed, efficiency and processing speed can be improved when selected area 43 is converted from gray scale to black/white or binary scale. A predetermined threshold gray value is selected. Any gray scale value above this threshold gray scale is converted to black and any gray scale value below this gray scale is converted to white, as shown in FIG. 8(*b*). After the conversion, one or more islands 44 are created in selected area 43. The predetermined threshold can be the average gray scale or can be any value less than 255. When the threshold is low, more islands are created and when the threshold is high, fewer islands are created. The threshold value can also be adjusted while scanner 10 is in operation to assist with the image stitching process. Islands 44 in selected area 43 can be used to match an image to adjacent images. To minimize calculation errors, during the island matching process the size and location of islands 44 are compared. If the size difference or the location difference exceeds predetermined thresholds, then CPU 28 would also return an error message.

During the stitching process, unmatched points from one triangulated image are searched for in adjacent triangulated images. If the unmatched image points in one image have corresponding matched image points in adjacent images, then the matched points are used. If too many unmatched points remain, CPU 28 may discard the images and instruct the camera pairs to take another set of images of the foot.

Figure 9:
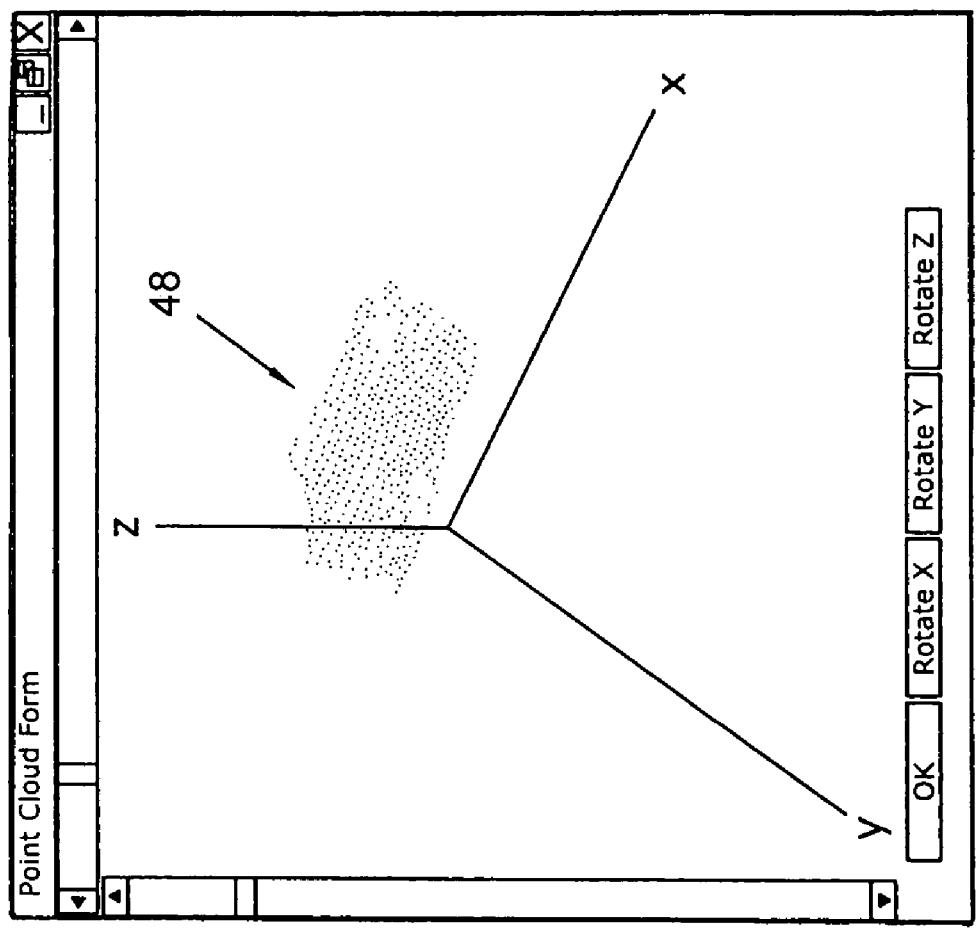
FIG. 9 is an exemplary point cloud representative of a scanned foot

From the seven images captured by the seven camera pairs 22, point cloud 48 representing the scanned foot can be generated after the seven images are stitched together, as shown in FIG. 9. As described above, since the relative and fixed positions of camera pairs 22 on platform 20 in scanner 10 are known, and since the images taken by the camera pairs also contain three-dimensional positions of each pixel relative to the cameras, point cloud 48 is a three-dimensional representation of the scanned foot.

Alternatively, instead of a point cloud representation a convolution filtering process can be applied to the stitched image to provide an embossed view of the foot. Convolution filtering is commonly used in commercially available photoshop software and is typically used to provide a clearer outline of the scanned object.

As will be recognized by those in the art, camera pairs 22 may alternatively include three or more cameras to form camera clusters. Each camera cluster would be positioned in scanner 10 as camera pairs 22, as described above. The binocular triangulation method described above could be achieved by using signals obtained from any two cameras within a camera cluster. For example, a camera cluster may include three cameras, A, B, and C. Cameras A and B could be used to obtain one triangulation point, Cameras B and C could be used to obtain a second triangulation point, and/or Cameras A and C could be used to obtain a third triangulation point. Obtaining several readings from each camera cluster could help to assure the accuracy of the measurements.

Figure 10:
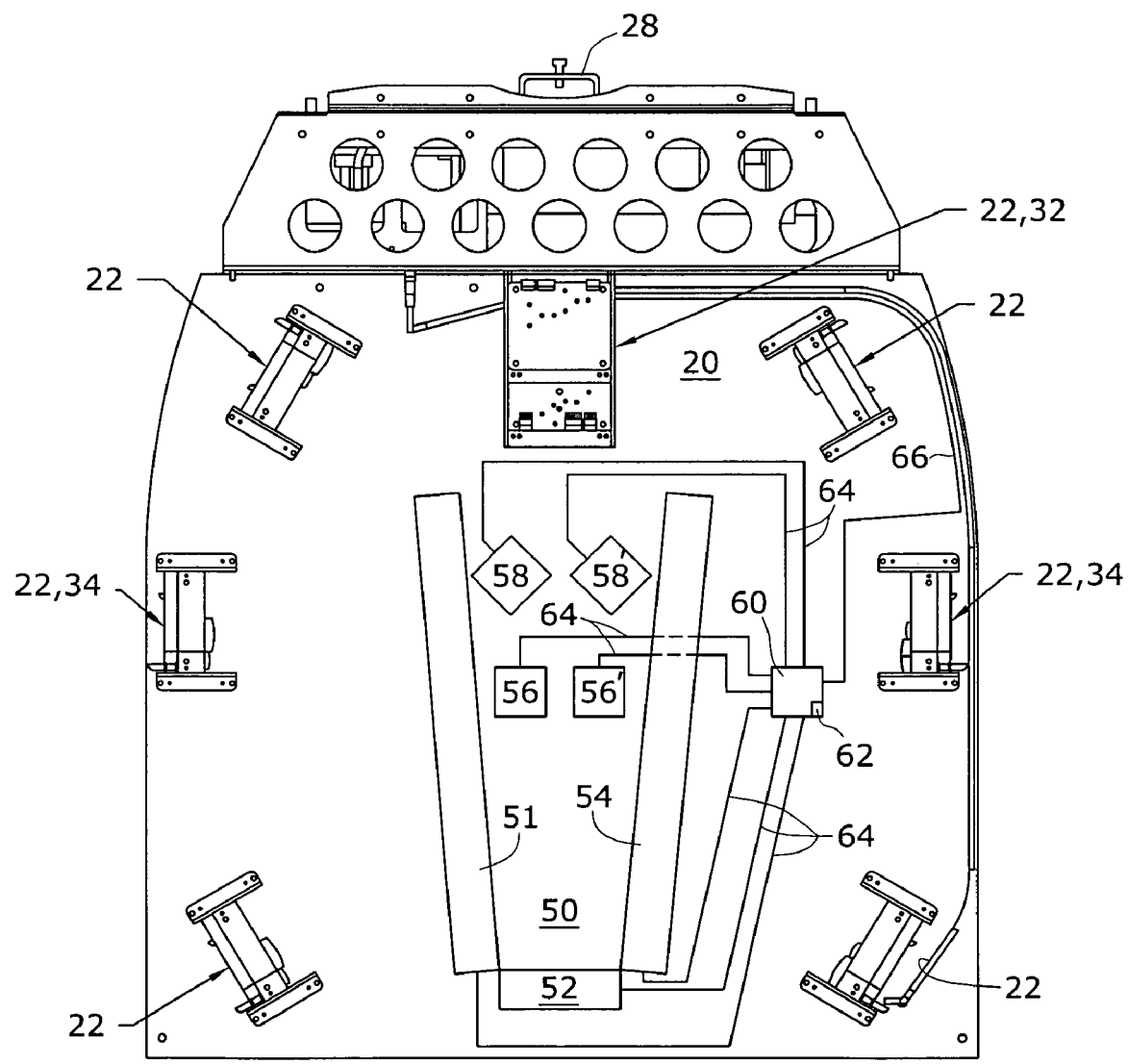
FIG. 10 is a top view of an alternate embodiment of the cameras and processing equipment of a scanner in accordance with the present invention showing the sensors and processing equipment of an automated foot placement system.

Referring to FIG. 10, and exemplary process of scanning both feet is illustrated. Either the right foot or the left foot can be scanned first. The first step is to adjust the light level in cavity 18 (see FIG. 1) where the foot is inserted. Each camera or camera pair has its own light sensor. Scanner 10 may have its own unstructured light sources, which can be located between camera pairs 22 or located proximate to each camera pair. The amount of illumination generated by these light sources can be controlled by CPU 28 or by the PC controllers for the camera pairs depending on the level of light detected by the light sensors. In one embodiment, the light sources are attached to the underside of the roof of housing 16.

The next steps are to check all the cameras and to determine whether the foot is properly placed in cavity 18. If all of the foot, including toes and heel, can be imaged, then the foot positioning is acceptable. The placement of the foot can be checked by imaging the foot with some or all of the cameras. Scanner 10 may also optionally include a placement system 50 for determining the correct placement of objects within scanner 10.

Figure 3:
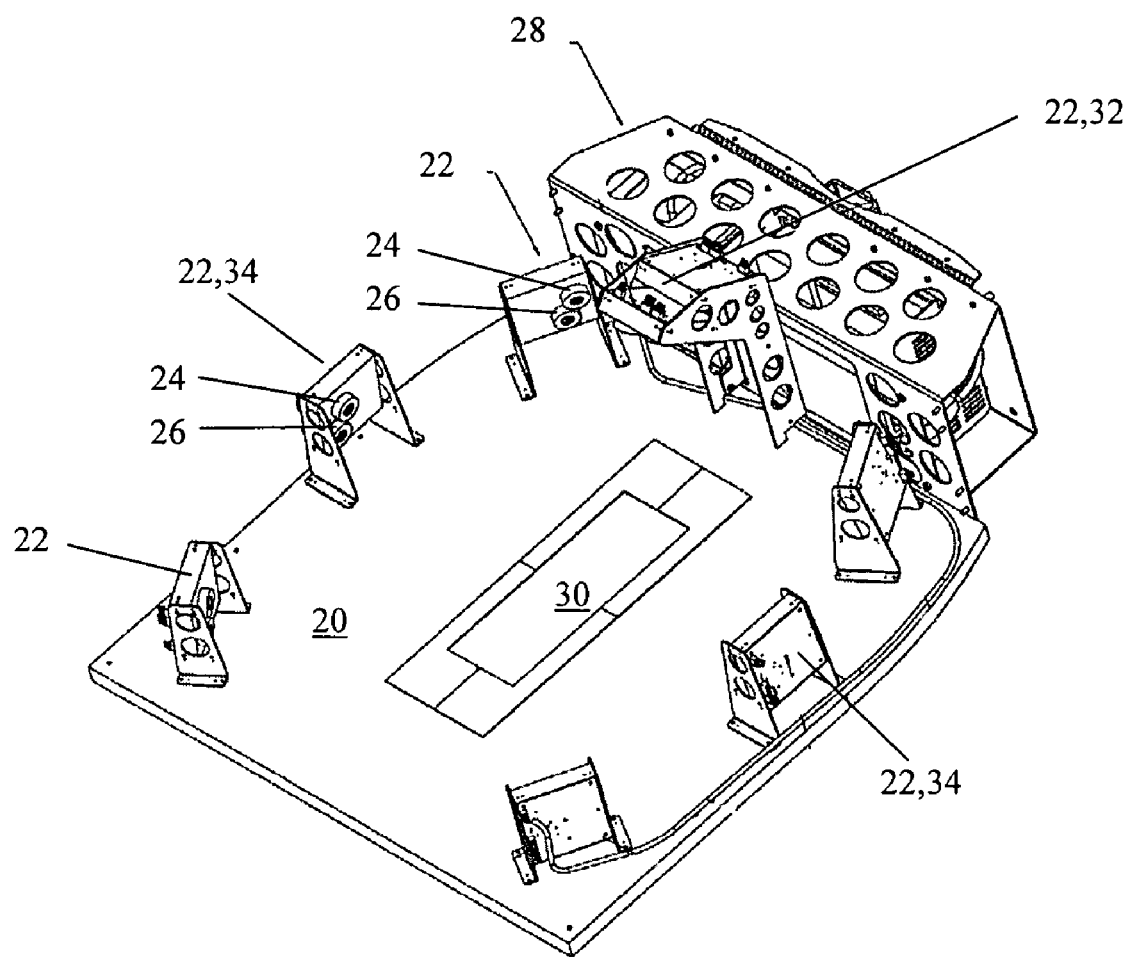
FIG. 3 is a perspective view of the cameras and processing equipment contained within the scanner of FIG. 1.

In one embodiment, as shown in FIG. 3, placement system 50 may be a visual guide. For example, a pad 30 is defined proximate to the center of platform 20 to provide visual cues for the correct or preferred placement of the foot. Pad 30 is preferably printed or colored to show a user a correct placement position.

In another embodiment, as shown in FIG. 10, system 50 may also be an automatic placement system that includes a plurality of sensors 51, 52, 54, 56, 56', 58, 58' for detecting the placement of the object to be scanned, a communication interface board 60 for gathering the information from sensors 51, 52, 54, 56, 56', 58, 58' and communicating the information to CPU 28, and associated software disposed on a hard surface such as platform 20. In one embodiment, platform 20 is made of aluminum, but it may be made of any rigid material, such as plastic, steel, or the like.

Sensors 51, 52, 54, 56, 56', 58, 58' are preferably pressure resistive sensors or sensor arrays that have low static resistance and high resistance when a force is applied thereto. For example, sensors 51, 52, and 54 are strip pressure resistive strip sensors and sensors 56, 56' and 58, 58' are pairs of pad sensors; all sensors are preferably permanently or removably affixed to platform 20, such as with an adhesive, welding or printing. As will be apparent to those in the art, any pad sensor pairs, i.e., sensors 56, 56' and 58, 58', may optionally be replaced with a single large sensor. Sensors 51, 52, 54, 56, 56', 58, 58' are preferably thin to prevent interference with the scanning process. In one embodiment, sensors 51, 52, 54, 56, 56', 58, 58' have a thickness less than about 2 mm.

Sensors 51, 52, 54, 56, 56', 58, 58' are preferably positioned on platform 20 such that, as shown in FIG. 10, when a foot is improperly placed on platform 20, sensor 52 encounters, a heel of a foot, i.e., sensor 52 is ON, sensor 51 or sensor 54 encounters the sides of a foot, and sensor pair 58, 58' encounters the toes. Similarly, when properly placed, sensor pair 56, 56' encounters a ball of a foot. In a special scenario, if a very large foot is properly placed on platform 20, sensor 51, sensor 54, and sensor pair 56, 56' all encounter parts of a foot. For this exemplary configuration, Table 1 illustrates various scenarios with combinations of sensors on or off and whether or not this results in a scan or a failure.

TABLE 1

Exemplary Sensor Combinations

| Sensor 51 | Sensor 52 | Sensor 54 | Sensor Pair 56, 56' | Sensor Pair 58, 58' | Result |
| --- | --- | --- | --- | --- | --- |
| OFF | OFF | OFF | ON | OFF | SCAN |
| ON | OFF | ON | ON | OFF | SCAN (assume very large foot) |
| OFF | OFF | ON | ON | OFF | FAILURE |
| ON | OFF | OFF | ON | OFF | FAILURE |
| OFF | OFF | OFF | ON | ON | FAILURE |
| OFF | ON | OFF | ON | OFF | FAILURE |
| OFF | OFF | OFF | OFF | OFF | FAILURE |

As will be apparent to those in the art, additional permutations exist for even this exemplary embodiment, such as where multiple sensors are ON in combinations not shown in Table 1. In such cases, the scan will not initiate. Additional configurations of sensors on platform 20 are also possible, where the combination of sensors ON and sensors OFF that result in a scan are determined based upon the actual configuration. For example, sensor pair 56, 56' may be eliminated, so that a scan will only initiate when no sensors are ON. In another example, only three sensors may be used, a toe sensor, a ball sensor and a heel sensor, where a scan will only initiate when all sensors are ON. In another example, all sensors could be placed very close together so that a scan will only initiate when all sensors are ON. All possible configurations of sensors are contemplated by the present invention.

Sensors 51, 52, 54, 56, 56', 58, 58' are connected to communications interface board 60 via connections 64. Connections 64 may be any type of connection known in the art, such as electrical wires or filaments, printed leads or a wireless link transmitting information from a transmitter on sensors 51, 52, 54, 56, 56', 58, 58'. Similar to sensors 51, 52, 54, 56, 56', 58, 58', connections 64 are preferably affixed to platform 20 using any method known in the art. Preferably, connections 64 are adhered to the surface of platform 20, e.g. by adhesives, tapes, etchings, etc.

Communications interface board 60 includes a microprocessor 62 and at least one digital comparator circuit (not shown) for converting the analog signals generated by sensors 51, 52, 54, 56, 56', 58, 58' into digital information usable by microprocessor 62. Preferably, each sensor has a dedicated digital comparator circuit. Communications interface board 60 is linked to CPU 28 using any method known in the art, preferably an electrical wire or filament such as connector 66.

Microprocessor 62 may be any microprocessor known in the art capable of collecting the digital inputs from the digital comparator circuit(s) and communicating with CPU 28. One such suitable microprocessor 62 is an IC MCU flash chip available from Microchip Technology Inc. of Chandler, Ariz. The communication with CPU 28 may be achieved by any method known in the art; however, for ease of manufacturing and interchangeability, the communication with CPU 28 is preferably achieved using a network according to the RS-485 standard protocol.

A thin film of material having a visual graphic printed or otherwise disposed thereupon preferably covers system 50, but at least covers sensors 51, 52, 54, 56, 56', 58, 58'. The film may be made of any material known in the art, but is preferably a material such as Mylar® having a non-smearing graphic printed thereupon.

To operate system 50, CPU 28 hosts a system manager software program. This program hosts the user interface program, preferably a graphical user interface (GUI), and provides all of the hardware, software, and GUI interaction. This program may be any type of program capable of performing these functions, and it may be written in any code known in the art. For example, the system manager communicates with communications interface board 60 to signal microprocessor 62 to interrogate sensors 51, 52, 54, 56, 56', 58, 58', as well to retrieve the information from sensors 51, 52, 54, 56, 56', 58, 58' to be interpreted by CPU 28.

Referring to FIG. 5, and exemplary process of scanning both feet is illustrated. Either the right foot or the left foot can be scanned first. The first step is to adjust the light level in cavity 18 (see FIG. 1) where the foot is inserted. Each camera or camera pair has its own light sensor. Scanner 10 may have its own unstructured light sources, which can be located between camera pairs 22 or located proximate to each camera pair. The amount of illumination generated by these light sources can be controlled by CPU 28 or by the PC controllers for the camera pairs depending on the level of light detected by the light sensors. In one embodiment, the light sources are attached to the underside of the roof of housing 16.

To initiate a scan, a user inserts an object such as a foot into scanner 10 and inputs through the GUI a signal to begin the scanning process. When the system manager program receives this input, the system manager queries microprocessor 62 using any type of communication known in the art, such as communications according to the RS-232 standard protocol. The next steps are to check all the cameras and to determine whether the foot is properly placed in cavity 18. The placement of the foot can be checked, for example following the process shown graphically in FIG. 6. First, the system manager sends a signal to the microprocessor to query sensors 51, 52, 54, 56, 56', 58, 58'. If the foot is appropriately positioned within the scanning area, then the system manager allows the scan to begin. If the sensors show a resistance, i.e., if the foot is placed on one of sensors 51, 52, 54, 56, 56', 58, 58' such that the foot is outside of the appropriate field of view of the camera pairs, then the system manager sends a signal to the GUI to instruct the user to reposition the foot in a certain direction, such as to move the foot forward, backward, or to the left or right or using any other method as known in the art.

After the foot position is confirmed, the foot can be re-imaged by all the camera pairs, or the first set of images can be fully processed. If the foot is improperly positioned, then the user is instructed to move his/her foot before the foot can be imaged.

After the images are taken by camera pairs 22, the images are analyzed to ensure their qualities, e.g., whether the number of unmatched image points are acceptable or whether the distance between the same point "a" seen by camera 24 and camera 26 is within acceptable range. Then the images can be stitched to form a point cloud.

Next, the CPU determines whether the point cloud is acceptable, e.g., whether selected areas 43 between adjacent images can be matched. Then, the point cloud is check to determine whether it resembles a foot.

Figure 11:
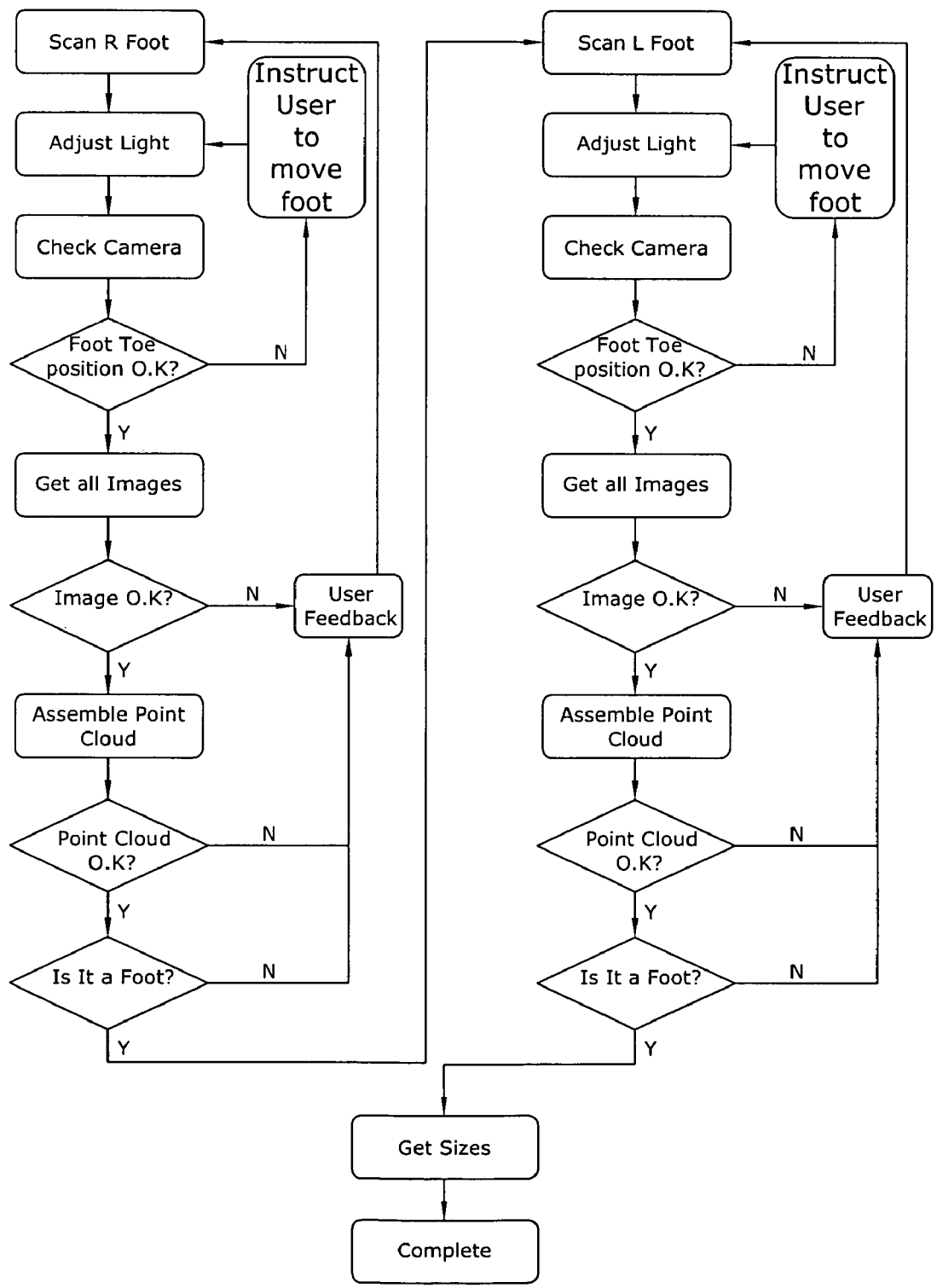
FIG. 11 is a flow chart showing an exemplary method for scanning a foot.
Figure 12:
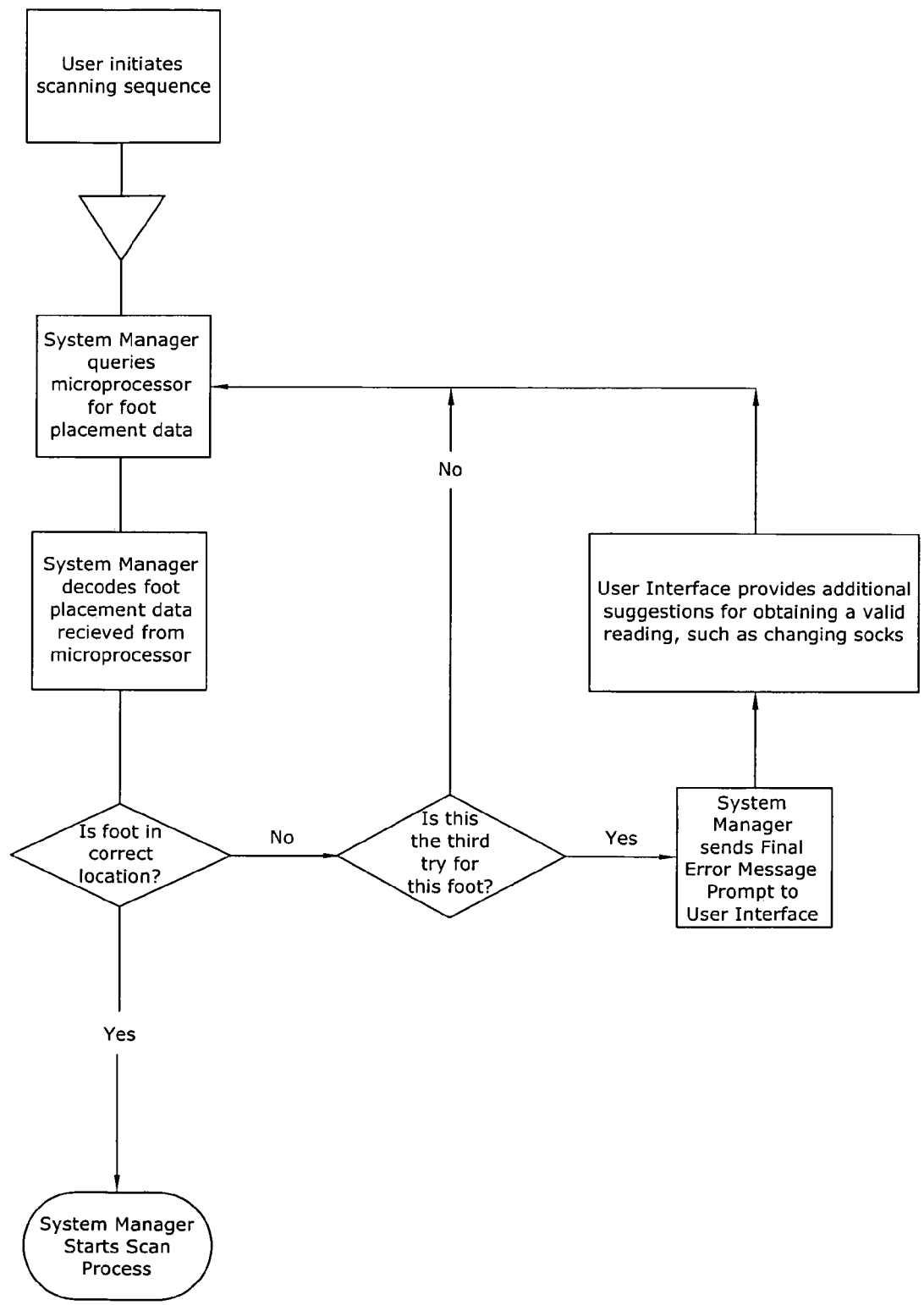
FIG. 12 is a flow chart showing an exemplary method for determining and/or correcting foot placement.

After these steps are satisfactorily executed, the other foot is scanned and the same steps are repeated, as shown in FIG. 11. After both feet are scanned, scanner 10 can determine the shoe size for the scanned feet.

Alternatively, after the feet are scanned/measured, the information is stored or used to make customized shoe lasts.

In accordance to another aspect of the present invention, each scanner 10 is provided with a communication device so that it can communicate with its home base. The communication device can be a telephone modem so that scanner(s) 10 communicates with home base through telephone lines. Alternatively, the communication device can be wireless, e.g., similar to blackberry e-mail devices. After a scanner 10 establishes communication with home base, it can transfer information stored thereon relating to the scanned feet to home base, and it can receive commands or information from home base, e.g., marketing information relating to the locality where scanner 10 is being deployed. The scanned feet information transferred to home base can be used to develop new shoe sizes to meet market needs.

In accordance to another aspect of the present invention, each scanner 10 has a unique IP address similar to the IP address of a desktop computer or laptop, so that home base can distinguish one scanner from another and that home base can send targeted information to different scanners.

While various descriptions of the present invention are described above, it is understood that the various features of the embodiments of the present invention shown herein can be used singly or in combination thereof. This invention is also not to be limited to the specifically preferred embodiments depicted therein.

What is claimed is:

1. A scanner comprising a plurality of camera groups positioned proximate an object to be scanned wherein the object is illuminated by unstructured light and wherein the object is covered by a textured surface, and wherein the cameras of the camera groups are positioned offset to each other in a first direction,
   wherein an incident angle is defined to be between a first line connecting a first image point of a first camera and a corresponding point on the scanned object and a second line connection a corresponding second image point of a second camera and said corresponding point of the scanned object and wherein said incident angle is less than about 90 degrees.

2. The scanner of claim 1, wherein the offset is between about 0.5 inches and 1.0 inches.

3. The scanner of claim 1, wherein each camera group contains at least two cameras.

4. The scanner of claim 3, wherein each camera group contains at least three cameras.

5. The scanner of claim 1, wherein the cameras in the camera groups are non-adjacent cameras.

6. The scanner of claim 1, wherein the cameras in the camera groups are adjacent cameras.

7. The scanner of claim 1, wherein the incident angle is less than about 45 degrees.

8. The scanner of claim 1, wherein the fields of view of a camera pair overlap by at least about 60%.

9. The scanner of claim 8, wherein the fields of view of a camera pair overlap by at least about 80%.

10. A scanner comprising:
    a housing being inclined at an angle from about 12° to 20°;
    a scanning platform on the housing comprising a predetermined scanning area;
    at least one sensor on the scanning platform to confirm placement of an object to be scanned on the scanning area;
    at least three camera pairs attached to the housing and positioned proximate the object wherein the object is illuminated by unstructured light and wherein the object is covered by a textured surface;
    wherein the cameras of the camera pairs have an aperture to provide a fixed focus depth of about 6 inches to 14 inches and are positioned offset to each other vertically and horizontally by about 0.5 inches and 1.0 inch; and
    a central processing unit to receive triangulated images of the object captured by the camera pairs.

\* \* \* \* \*